United States Patent [19]

Flory

[11] 4,361,165

[45] Nov. 30, 1982

[54] BREAKAWAY PIPE COUPLING WITH AUTOMATICALLY CLOSED VALVES

[75] Inventor: John F. Flory, Morris Township, Morris County, N.J.

[73] Assignee: Exxon Research and Engineering Co., Florham Park, N.J.

[21] Appl. No.: 176,080

[22] Filed: Aug. 7, 1980

[51] Int. Cl.$^3$ .................................................. F16K 17/40
[52] U.S. Cl. .................................. 137/69; 137/68 R; 137/614.02; 285/2; 285/DIG. 1
[58] Field of Search ...................................... 285/1-4, 285/95, DIG. 1; 137/614, 614.01, 614.02, 614.03, 67, 68 R, 69; 251/149.2, 149.6

[56] References Cited

U.S. PATENT DOCUMENTS

| | | | |
|---|---|---|---|
| 2,300,483 | 11/1942 | Berger et al. | 251/149.2 |
| 3,590,862 | 7/1971 | DeGruaf | 137/522 |
| 3,860,025 | 1/1975 | Nelson | 285/4 |
| 3,889,985 | 6/1975 | Gartmann | 285/95 |
| 3,913,603 | 10/1975 | Torres | 137/68 |
| 4,059,288 | 11/1977 | Mohr | 285/2 |
| 4,090,524 | 5/1978 | Albread et al. | 137/68 R |
| 4,127,142 | 11/1978 | Snider | 137/68 R |

FOREIGN PATENT DOCUMENTS

| | | |
|---|---|---|
| 6278 | 1/1979 | European Pat. Off. |
| 2317614 | 10/1974 | Fed. Rep. of Germany ... 285/DIG. 1 |

*Primary Examiner*—A. Michael Chambers
*Attorney, Agent, or Firm*—Robert S. Salzman; Donald F. Wohlers

[57] ABSTRACT

A breakaway pipeline coupling is described which comprises first and second pipe sections forming a fluid seal and designed to separate at a predetermined axial load. A plurality of piston and cylinder pressure compensating devices are arranged around the exterior of the pipe sections to hold them together until separation.

Shear pins or shear studs passing between the pipeline sections will fail when the coupling is subjected to an external tensile force exceeding the predetermined maximum force. The pressure compensating devices apply a compression load on the coupling to counteract the tension load exerted by internal pressure in the pipeline. The pressure compensating devices included pistons movable axially within cylinders in response to pressure differentials, and porting or tubing for exposing one side of the piston to the internal pressure within the coupling.

When internal pressure produces a force which tends to separate the coupling, an opposing compressive force resulting from the pressure acting on the pistons tends to hold the coupling together. External tensile force tending to separate the coupling are resisted by the shear pins, but when a predetermined maximum external tensile force is exceeded, the shear pins fail and the pipeline sections separate.

A first, normally closed valve is located within the first pipeline section, and a second, normally closed valve, or a valve lock pin, is located in the second pipeline section. When the pipeline sections are joined together, the valve(s) is locked in the open position and fluid can flow freely through the coupling and the pipeline in which the coupling is assembled. As the sections move relative to one another, each valve is shut to that the contents of the pipeline are not discharged into the environment.

12 Claims, 6 Drawing Figures

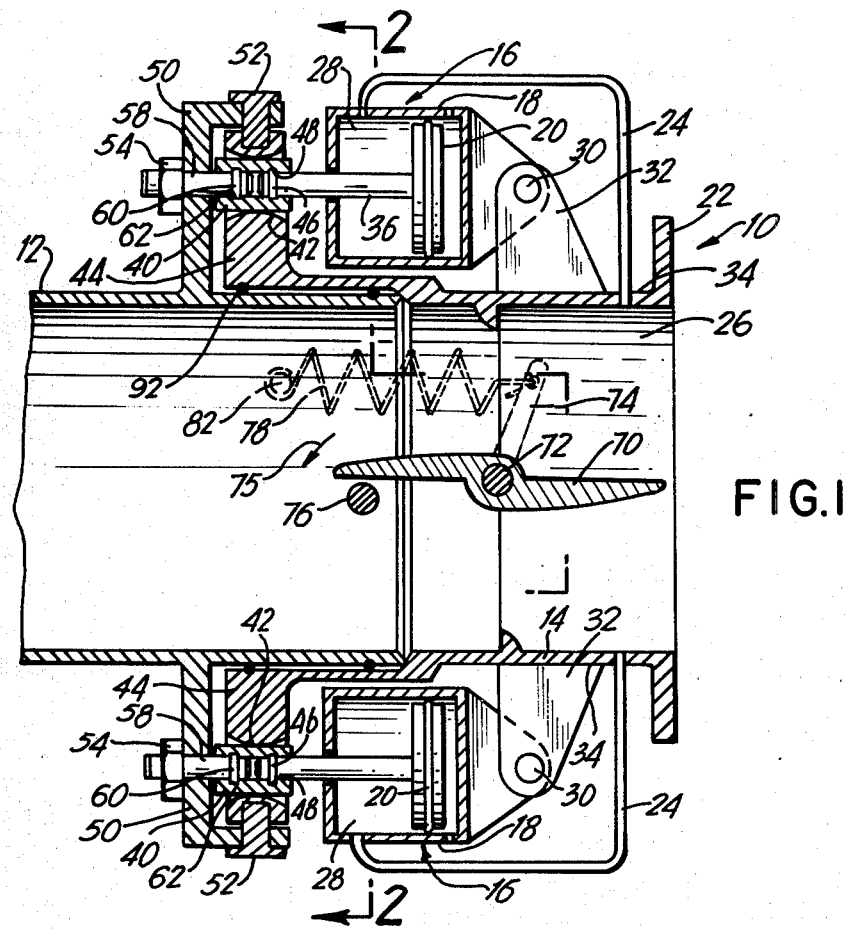
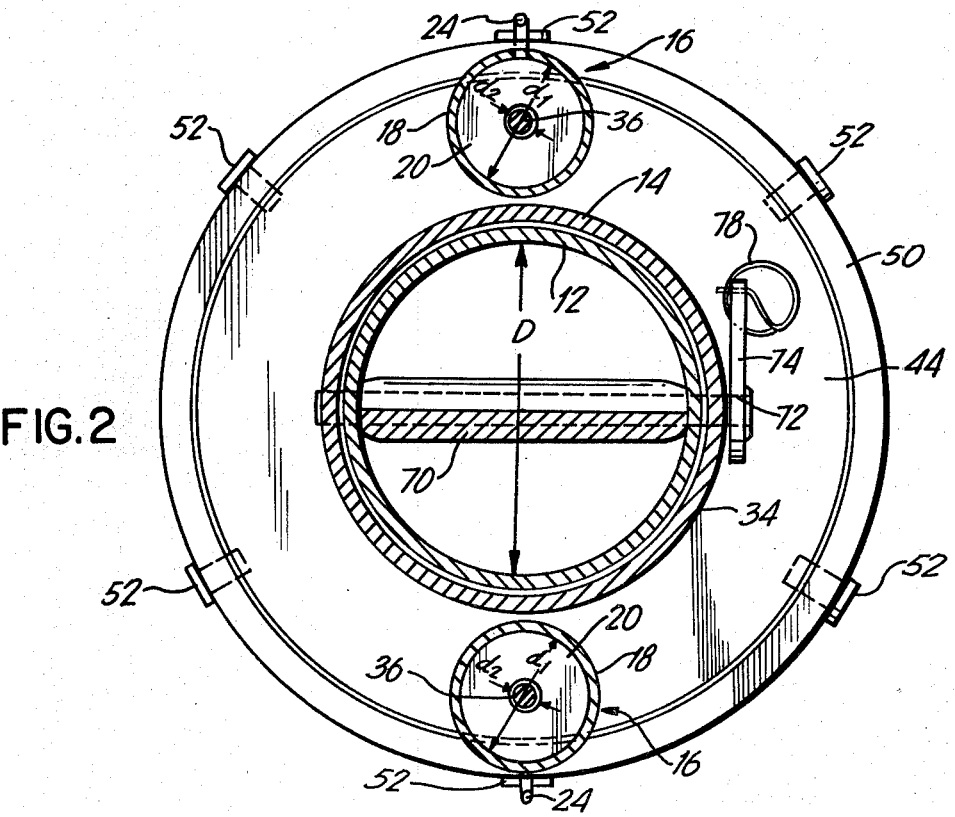

BREAKAWAY PIPE COUPLING WITH AUTOMATICALLY CLOSED VALVES

BACKGROUND OF THE INVENTION

1. Field of the Invention

This invention relates generally to breakaway pipeline couplings designed to separate when subjected to externally applied tensile loads exceeding a predetermined limit in order to prevent structural damage to other piping components. More particularly, this invention relates to breakaway pipeline couplings utilizing pressure compensating mechanisms to counteract tensile loads produced by internal pressure which might otherwise cause the coupling to separate.

2. Description of the Prior Art

Breakaway pipeline couplings for use in pipelines for transmitting oil, gas and other fluids are known. One commercially available breakaway pipe coupling is described in U.S. Pat. No. 4,059,288, issued Nov. 22, 1977 to Harvey O. Mohr. Another commercially available breakaway pipe coupling is described in European Patent application Publication No. 0006278A1, by Gall Thomson, published Jan. 9, 1980.

The Mohr patent discloses a separable safety pipeline connector which will separate at a predetermined externally applied tension, but which will be insensitive to variations in tension caused by internal pipeline pressure. The connector includes a housing having one axial end adapted for connection to the pipeline, and with the other axial end open. The connector includes a pipe extension member having one axial end adapted for connection to the pipeline for transmission of line fluids therethrough and with the other axial end arranged to telescope coaxially with the housing in sealed relationship therewith. A shear disc is mounted beween the housing and extension member for restraining the same against axial separation in response to axial tension loads applied thereto. The shear disc is sized to rupture at a predetermined axial load level, so that axial separation is prevented below such a load level. The housing and extension member define an annular chamber therebetween, whereby fluid pressure within the chamber forces the housing and extension member axially together to thereby balance line pressure. A port is provided through the extension member to communicate line pressure to the chamber.

The pressure balanced, breakaway pipe couplings disclosed by both the aforementioned Mohr patent and Thompson application recognize the need for compensating internal pipeline pressures, but do not address other structural and functional needs. For example, both the aforementioned couplings are expensive to fabricate and install, due, at least in part, to the several large-diameter, concentric, precision machined surfaces which must be provided in the pressure compensation chamber and piston apparatus. Furthermore, the Mohr coupling makes no provision for terminating the fluid flow through the coupling upon its separation, thus allowing the contents of the pipeline to be discharged into the environment.

SUMMARY OF THE INVENTION

With the deficiencies of known breakaway pipeline couplings clearly in mind, the present invention contemplates a breakaway pipeline coupling utilizing a plurality of piston and cylinder mechanisms. These mechanisms provide pressure compensation and are arranged external to the pipeline coupling sections. These piston and cylinder mechanisms are simple to manufacture and are easy to maintain. The cylinders are ported to the interior of the pipeline to provide compressive forces that counteract the tension forces produced in the pipeline by internal pressure.

The instant pipeline coupling utilizes butterfly valves which are positioned to interlock in the open position. Immediately upon relative movement between the coupling sections, the valves are closed in order to stop fluid flow. Thus, excessive spillage of fluid from the separated coupling sections is averted.

Numerous other advantages of the embodiments of the instant breakaway pipeline coupling will become apparent from the following detailed description considered in conjunction with the accompanying drawings.

BRIEF DESCRIPTION OF THE DRAWINGS

FIG. 1 is a cross-sectional view through a preferred embodiment of a pressure-compensated breakaway pipe coupling constructed in accordance with the principles of this invention;

FIG. 2 is an end view of the pipe coupling of FIG. 1, such view being taken along line 2—2 of FIG. 1;

DESCRIPTION OF THE PREFERRED EMBODIMENT

Figure 3:
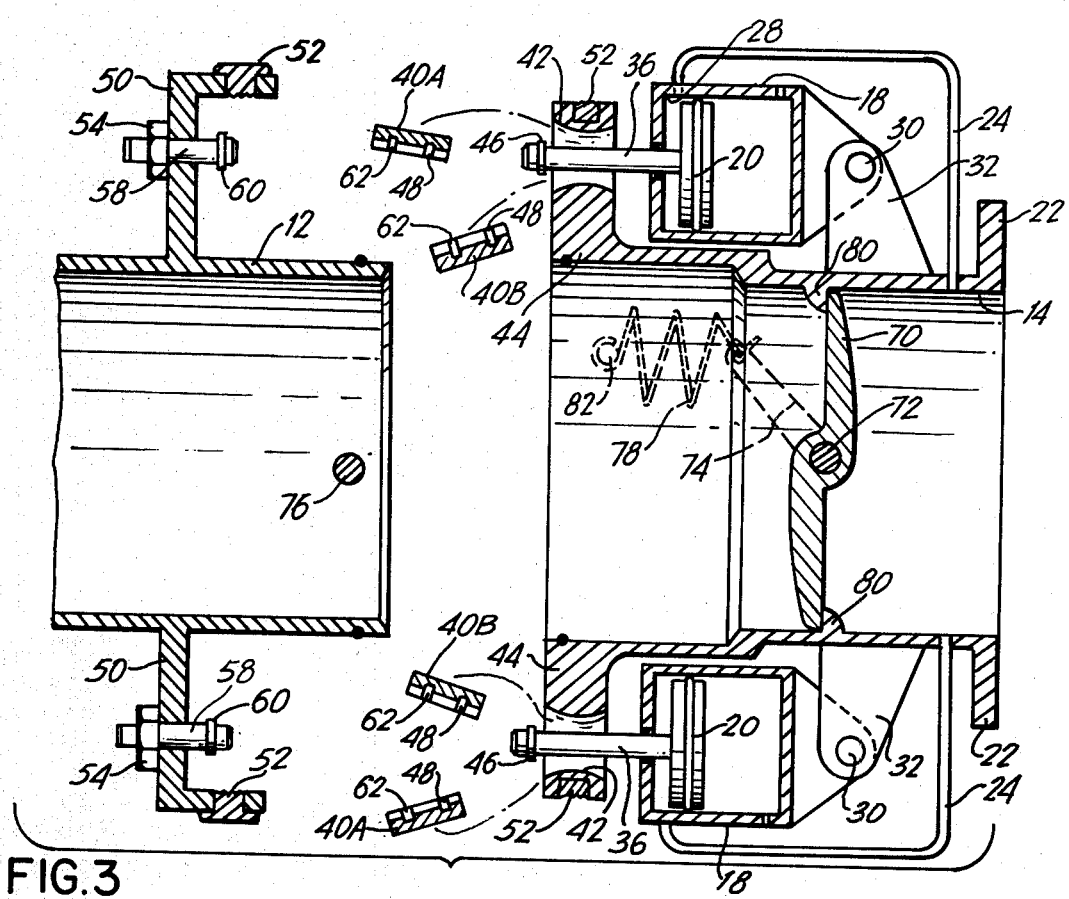
FIG. 3 is a view similar to FIG. 1, but showing the coupling sections of the pipeline coupling fully separated.

Both embodiments of the instant breakaway pipe coupling can be used in diverse marine terminal applications. For example, referring to FIG. 6, the breakaway pipe coupling devices 10 shown in schematic only, could be interposed between sections of floating hose 101 attached to a buoy 102 in a catenary anchor leg mooring (CALM), or could be positioned between sections of underwater hose 103 connecting the buoy 102 with an underwater pipeline manifold 104. The breakaway pipe coupling could also be utilized between the underwater pipeline manifold 104 and the pipeline 105 or at any point in the pipeline. Alternatively, the coupling could be positioned between a hose string and the pipeline manifold at a multiple buoy mooring. At a pier, the coupling could be utilized effectively in loading arms, or between hoses and piping on the pier. Several other marine terminal applications and many other pipeline and hose system applications are also envisioned.

Figure 6:
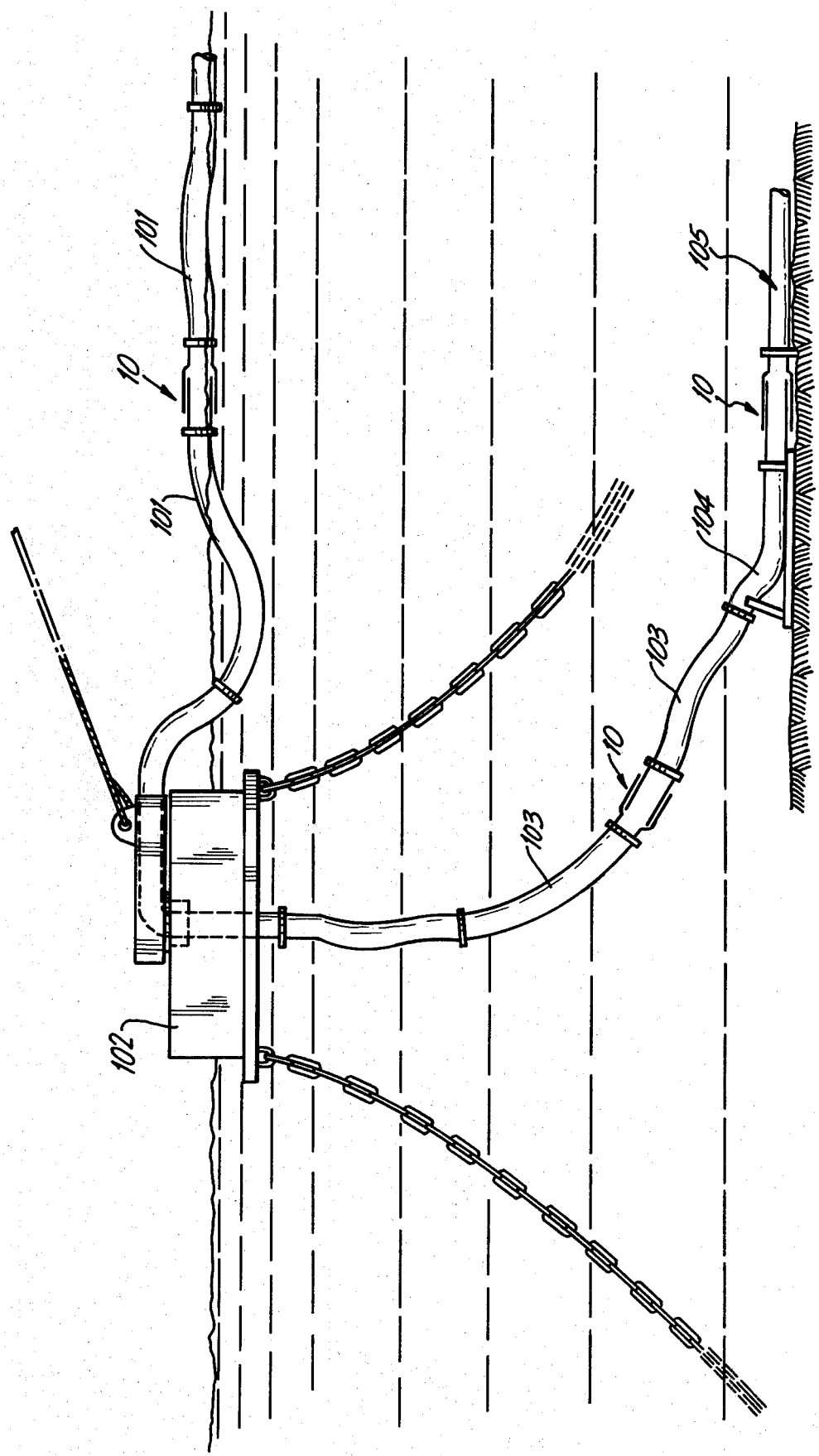
FIG. 6 is a schematic view of the breakaway coupling of this invention shown in situ at a typical application; an offshore mooring for tankers.

Referring to FIGS. 1 through 3, sectional views of the pipeline coupling device 10 of this invention are shown. The coupling device 10 is designed to fix in a portion of a pipeline or hose system as schematically shown in FIG. 6, and comprises a first coupling cylindrical section 12, which is coaxially fitted (telescoped)

within a second coupling cylindrical section 14. These coupling sections are in sealing arrangement with each other such that fluid will pass through the coupling and said pipeline. Seals 92 prevent leakage of fluid from the interface between the two coupling sections. The coupling device 10 may be integral with the pipeline as is coupling section 12 or may be bolted into the pipeline through the end flange 22. The coupling sections 12 and 14 are secured together by a plurality of pressure compensation cylinders 16, which structurally bridge between the coupling sections, and which comprise a cylinder 18 and a piston 20 disposed therein and a shaft 36 attached to the piston and extending from the cylinder. Pressure lines 24 communicate between the interior 26 of coupler section 14 to the interior 28 of the piston shaft end of each cylinder 28.

Each pressure compensation cylinder 16 is connected by a pin 30 to a trunnion 32 secured to and extending from the outer surface 34 of coupler section 14.

In each pressure compensating cylinder 16 the piston shaft 36 extends from the piston 20 through each cylinder 18 to a split collar 40 movably disposed in a fluted opening 42 in a nut retaining flange 44 extending from coupling section 14. The shaft 36 has an annular lip 46 which fits in a groove 48 of said collar 40 and affixes the shaft 36 to the split collar 40.

A flange 50 extending from coupling section 12 is secured to the flange 44 of section 14 by a plurality of shear pins 52, which are arranged periperally about and extend radially through mating flanges 44 and 50, as shown in FIG. 2.

A shaft 58 is bolted to flange 50 via nut 54 and is affixed to the split collar 40 by means of an annular lip 60, whch fits in groove 62 of the collar 40.

Coupling section 14 has a butterfly valve disk 70 pivoted therein upon shaft 72 extending through the walls of section 14 as shown. An arm 74 mounted on shaft 72 is connected through a spring 78 attached to the nut retaining flange 44 at point 82. This spring biases the butterfly valve disk 70 against (arrow 75) stop 76 which extends across coupling sectin 12.

OPERATION OF THE INVENTION

The pressure compensation operation of the invention will be explained with particular reference to FIGS. 1 and 2.

Cylinders 16 apply a compression force on the breakaway pipeline coupling 10 to counteract the tension load exerted by internal pressure. Pressure communicated from the interior of pipe section 14 to the cylinders 18 act against the pistons 20 and through shafts 36 and 58 tend to draw flange 50 toward the cylinders.

To illustrate, let N cylinders be use for pressure compensation, each cylinder having an internal diameter $d_1$, and a shaft diameter $d_2$, as shown in FIG. 2. Thus, at a pressure P, the total compressive force exerted by the cylinders is:

$$F_c = NP\pi \left( \frac{d_1^2}{4} - \frac{d_2^2}{4} \right)$$

The tension exerted by the internal pressure in the pipe sections 12 and 14, which have an internal diameter D, is:

$$F_t = P\pi(D^2/4)$$

Since it is intended that the compression force ($F_c$) equals the tension force ($F_t$) in order to achieve complete pressure compensation, it follows that:

$$N(d_1^2 - d_2^2) = D^2.$$

Applying these mathematical relationships to the pressure compensating mechanism of FIGS. 1 and 2, four cylinders, each with an internal diameter of 11.75 inches and a 1.25 inch diameter shaft, would essentially balance pressure within a 23.25 inch interior diameter pipe.

The pressure compensating cylinder arrangement insures that there is no appreciable change in the load applied to the shear studs 52 as a result of changes in the internal pressure in the pipe. However, any change in the tension load due to external forces on the pipeline system is applied to the shear studs 52.

The breakaway operation of the breakaway pipe coupling 10 is readily apparent from a comparison of FIGS. 1 and 2 with FIG. 3.

The shear studs 52 are sized to separate when a predetermined tension load is applied tending to separate coupler sections 12 and 14. When the shear studs 52 separate as a result of a tension load higher than the design load, the pipe sections 12 and 14 begin to separate, as shown in FIG. 3. The separation causes the piston shafts 36 to extend and the collar-retaining flange 44 to move back from its normal position over the split collars 40. The split collars 40 thus move out of the openings 42 in flange 44. As soon as the split collars 40 are free from the openings 42 in flanges 44, they separate in halves 40A and 40B, thereby disconnecting the piston shafts 36 and 58. The pipe sections 12 and 14 are then completely separated.

The valve closure operation of the breakaway pipe coupling 10 is readily apparent from a comparison of FIGS. 1 and 2 with FIG. 3. In the normal position, FIGS. 1 and 2 the valve 70 is held against the stop 76 by tension in the spring 78. When the coupler sections 12 and 14 separate, FIG. 3, butterfly valve disk 70 is released from stop 76 and pivots about shaft 72 to seat against valve seat 80. The spring 78 drives the butterfly valve to its closed position against seat 80 and holds it there. In the closed position the valve prevents flow through pipe section 14 when the pipeline coupling sections 12 and 14 are disconnected.

The breakaway pipeline coupling 10 can easily be serviced, for the cylinders 16 can be removed and replaced without disassembly of the entire coupling. The cylinders 16 can be disassembled, repacked, and reassembled in the field without special tools.

Figure 4:
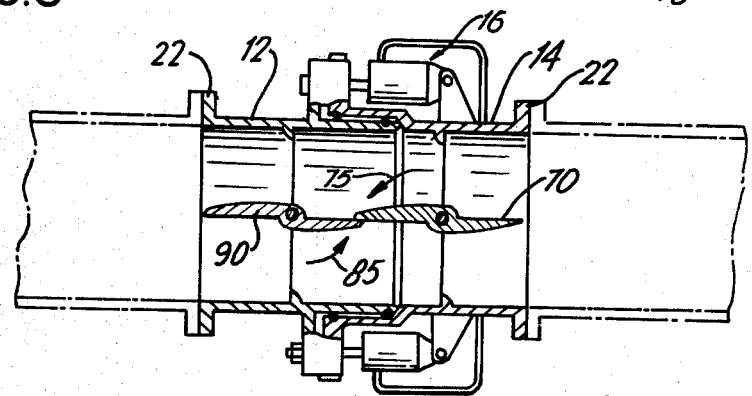
FIG. 4 is a cross-sectional view through an alternative embodiment of a connected pressure-compensated breakaway pipe coupling, said embodiment featuring two butterfly valves, one valve disposed in each coupling section.
Figure 5:
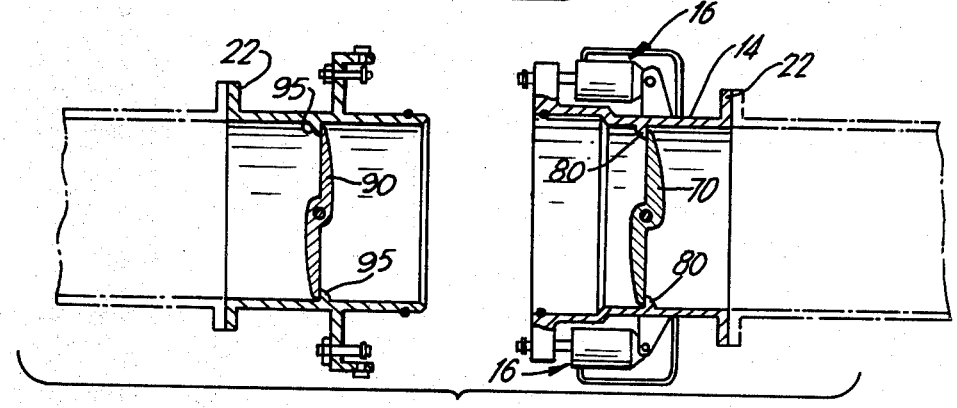
FIG. 5 is a view of the embodiment of FIG. 4 with the coupling sections separated and the valves in a closed position.

Now referring to FIGS. 4 and 5, another embodiment is shown for the butterfly valve disk 70. Instead of having the valve disk 70 abut against stop 76 as shown in FIG. 1, this embodiment features a second butterfly valve disk 90 disposed in section 12 which interlocks with the first butterfly valve disk 70 in section 14, that is butterfly valve disk 70 is spring biased (arrow 75) towards valve disk 90, and valve disk 90 is similarly spring biased towards valve disk 70 (arrow 85) such that each valve disk is locked in the open position when coupling sections 12 and 14 are secured, as shown in FIG. 4.

Upon separation of coupling sections 12 and 14, as shown in FIG. 5, each butterfly valve disk 70 and 90, respectively is free to close, because the other valve disk is not blocking its rotation to its closed position.

That is, valve 70 seats against seat 80, and valve 90 seats against seat 95, as shown. Although not illustrated in FIGS. 4 and 5, it will be understood that the butterfly valve disks 70 and 90 are closed through spring bias force acting through a lever arm 74 exterior of the pipe coupling in a fashion similar to that shown for operating the single valve disk 70 in FIG. 1. In both the FIG. 1 and FIG. 4 embodiments, resetting of the disks to their open position upon reassembly of the coupling after failure may be accomplished by appropirate rotational force on the lever arm 74 to cock the disk into an open valve position.

Having thus described the invention, it can be observed that the objectives have been achieved. Therefore, what is desired to be protected by Letters Patent is presented by the following claims.

What is claimed is:

1. A pressure compensated pipeline coupling, comprising:
   (a) first and second coupling sections, normally joined together such that fluid can flow through said coupling sections, each coupling section including a radially extending flange in axial overlapping relationship with the flange on the other coupling section;
   (b) locking means between said coupling sections for securing said sections together, said locking means including a plurality of shear pins extending radially between said flanges, said shear pins being sized to fracture in response to tensile loads exceeding a predetermined limit, thus allowing said coupling sections to separate; and
   (c) pressure compensation means associated with said locking means and said first and second coupling sections for exerting compressive force upon said locking means, said pressure compensation means including a plurality of cylinders mounted on said first coupling section externally thereof, each cylinder including an actuating rod extending through an associated aperture in one of said flanges and connected to the other said flange, each said actuating rod including split collar means located within its respective aperture prior to fracture of said shear pins, whereby upon fracture of said sheer pins and axial separation of said first and second coupling sections said split collar means are released and said rod is disengaged from said other flange, said cylinders being in fluid pressure communication with said fluid within said coupling sections.

2. The pressure compensated pipeline coupling as defined in claim 1, further including means defining an end wall in each cylinder having an aperture therein, a piston in each cylinder, each said actuating rod being connected to an associated piston and extending axially from said piston and projecting through each said aperture.

3. The pressure compensated pipeline coupling as defined in claim 4, further including conduit means connected between an interior portion of one of said coupling sections and an interior portion of each of said cylinders on a piston shaft side of said cylinders such that each of said piston shafts exert compressive force on said locking means proportional to the fluid pressure within said coupling sections.

4. The pressure compensated pipeline coupling as defined in claim 3, wherein the sum of effective interior cross-sectional areas on the actuating rod side of said piston is essentially equal to an interior cross sectional area of said coupling sections, such that the total compressive force exerted by said actuating rods is essentially equal to the tension force exerted on said locking means by fluid pressure within said coupling sections.

5. A pipeline coupling in accordance with claim 1 including valving means pivotally mounted in at least one of said coupling sections.

6. A valve sealed pipeline coupling, comprising:
   (a) first and second coupling sections, normally joined together;
   (b) locking means joining said first and second coupling sections such that fluid can flow through said coupling sections, said means including a plurality of shear pins extending radially between aligned apertures in overlapping portions of said sections;
   (c) valving means pivotally mounted in said first coupling section;
   (d) means disposed in said second coupling section, for normally holding said valving means in the open position, when said first and second coupling sections are joined; and
   (e) pressure compensation means associated with said locking means and said first and second coupling sections for exerting compressive force upon said first and second coupling sections and said locking means, said pressure compensation means including a plurality of cylinders mounted externally on said first coupling section, each of said cylinders being in fluid pressure communication with said fluid within said coupling sections and including a piston shaft connected to said second coupling section and means to operatively disconnect said piston shaft from said second coupling section upon fracture of said shear pins when said pipeline coupling is subjected to excessive axial tension forces.

7. The valve sealed pipeline coupling as defined in claim 6 wherein said valving means comprises a valve disk, and wherein said holding means bears against said valve disk preventing it from moving to the closed position, and wherein said valve disk is free of said holding means when said coupling sections separate, thus allowing said valving means to close.

8. The valve sealed pipeline coupling as defined in claim 7 further comprising a spring associated with said valve disk wherein said valve disk is biased to a closed position by said spring.

9. The valve sealed pipeline coupling as defined in claim 7 wherein said holding means comprises a second valve disk pivotally mounted in said second coupling.

10. The valve sealed pipeline coupling as defined in claim 9, wherein said first and second valve disks mutually prevent each other from moving to a closed position.

11. The valve sealed pipeline coupling as defined in claim 10, wherein said first and second valve disks are free to close when said coupling sections separate.

12. The valve sealed pipeline coupling as defined in claim 11, including a spring for each valve disk wherein said valve disks are biased to a closed position by said springs.

* * * * *